`US009791598B2`

(12) United States Patent
Katayama

(10) Patent No.: US 9,791,598 B2
(45) Date of Patent: Oct. 17, 2017

(54) ARTICLE HAVING COATING ON SUBSTRATE, COATING COMPOSITION, AND COATING METHOD

(71) Applicants: NIKON CORPORATION, Tokyo (JP); ESSILOR INTERNATIONAL (COMPAGNIE GENERALE D'OPTIQUE), Charentol le Pont (FR)

(72) Inventor: Yukiko Katayama, Kawasaki (JP)

(73) Assignees: ESSILOR INTERNATIONAL (COMPAGNIE GENERALE D'OPTIQUE), Charenton le Pont (FR); NIKON CORPORATION, Tokyo (JP)

( * ) Notice: Subject to any disclaimer, the term of this patent is extended or adjusted under 35 U.S.C. 154(b) by 0 days.

(21) Appl. No.: 15/142,722

(22) Filed: Apr. 29, 2016

(65) Prior Publication Data
US 2016/0245960 A1    Aug. 25, 2016

Related U.S. Application Data

(63) Continuation of application No. PCT/JP2013/006468, filed on Oct. 31, 2013.

(51) Int. Cl.
| | |
|---|---|
| *G02B 1/04* | (2006.01) |
| *G02B 1/18* | (2015.01) |
| *C09D 5/00* | (2006.01) |
| *C09D 133/16* | (2006.01) |
| *C09D 183/04* | (2006.01) |
| *C08K 5/549* | (2006.01) |
| *C09D 7/12* | (2006.01) |
| *C08G 77/04* | (2006.01) |
| *C08G 77/24* | (2006.01) |

(52) U.S. Cl.
CPC ............... *G02B 1/18* (2015.01); *C08K 5/549* (2013.01); *C09D 5/00* (2013.01); *C09D 7/1233* (2013.01); *C09D 133/16* (2013.01); *C09D 183/04* (2013.01); *G02B 1/041* (2013.01); *G02B 1/043* (2013.01); *C08G 77/045* (2013.01); *C08G 77/24* (2013.01)

(58) Field of Classification Search
CPC ...... C08K 5/549; C09D 133/16; C08F 220/24
See application file for complete search history.

(56) References Cited

U.S. PATENT DOCUMENTS

| | | | |
|---|---|---|---|
| 2005/0009953 A1 | 1/2005 | Shea | |
| 2013/0178568 A1 | 7/2013 | Meuler et al. | |

FOREIGN PATENT DOCUMENTS

| | | |
|---|---|---|
| JP | 2007-524732 A | 8/2007 |
| WO | 2013/177579 A2 | 11/2013 |

OTHER PUBLICATIONS

Mabry et al., "Optically Transparent, Omniphobic Fluoropolymer Coatings Modified With Octasilsesquioxanes" Polymer Preprints, vol. 50, No. 2, pp. 839-840, 2009.
Jul. 21, 2014 International Search Report issued in International Patent Application No. PCT/JP2013/006468.
Jun. 13, 2017 Office Action issued in Japanese Patent Application No. 2016-520119.

*Primary Examiner* — Kuo-Liang Peng
(74) *Attorney, Agent, or Firm* — Oliff PLC

(57) ABSTRACT

Provided is a coating technology additionally excellent in, for example, water repellency, oil repellency, and ease of dirt removal. An article having a coating on a substrate, in which the coating contains:
(a) a polyhedral oligomeric silsesquioxane; and
(b) an acrylate polymer having a structural unit represented by the following general formula (II): where Ra represents a hydrogen atom or a methyl group, Rf represents $-CH_2-(CF_2)_q-CF_3$ or $-CH(CF_3)_2$, and q represents an integer of 0 to 8.

General formula (II)      [Chem. 2]

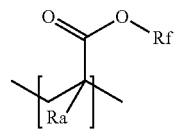

13 Claims, 16 Drawing Sheets

ARTICLE HAVING COATING ON SUBSTRATE, COATING COMPOSITION, AND COATING METHOD

This is a Continuation of International Patent Application No. PCT/JP2013/006468 filed Oct. 31, 2013. The disclosure of the prior application is hereby incorporated by reference herein in its entirety.

BACKGROUND

The present invention relates to a coating technology for a material.

Document 1 describes a coating agent containing a silsesquioxane compound.

Scott T. Iacono, Sean A. McGee, William D. Hunt, Dennis W. Smith, Jr., and Joseph M. Mabry, "OPTICALLY TRANSPARENT, OMNIPHOBIC FLUOROPOLYMER COATINGS MODIFIED WITH OCTASILSESQUIOXANES", Polymer Preprints 2009, 50(2), 840

SUMMARY OF THE INVENTION

As an optical material, a display with a touch panel, or the like has been required to have improved surface antifouling property, a coating technology additionally excellent in, for example, water repellency, oil repellency, and ease of dirt removal has been required.

According to an embodiment of the present invention, provided is an article having a coating on a substrate, in which the coating contains:

(a) a polyhedral oligomeric silsesquioxane; and
(b) an acrylate polymer having a structural unit represented by the following general formula (II):

General formula (II)

[Chem. 2]

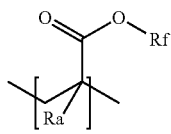

where Ra represents a hydrogen atom or a methyl group, Rf represents $-CH_2-(CF_2)_q-CF_3$ or $-CH(CF_3)_2$, and q represents an integer of 0 to 8.

The a polyhedral oligomeric silsesquioxane can be represented by the following general formula (I);

General formula (I)

[Chem. 1]

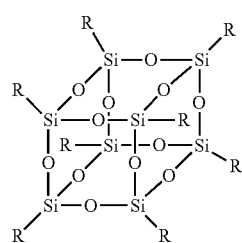

where R represents $-(CH_2)_2-(CF_2)_p-CF_3$, and p represents an integer of 0 to 9;

The q can represent an integer of 0 to 5.

The coating can contain the polyhedral oligomeric silsesquioxane at least in the following proportion X:

the proportion X refers to, in "profile where as the proportion of the polyhedral oligomeric silsesquioxane increases, liquid droplet sliding angle on the surface of a coating film decreases or temporarily increases and then decreases, but a change in the decrease gradually becomes smaller," a proportion at a starting point at which the change becomes smaller.

The coating can have a surface arithmetic mean roughness of 2.5 nm or less.

The coating can have water repellency and oil repellency in which a sliding angle for linoleic acid is 4.0 degree or less and a sliding angle for pure water is 4.0 degrees or less.

The article can have a transmittance to light having a wavelength of 400 to 850 nm of 93% or more.

The substrate can have an optical power.

The article can be an ophthalmic lens.

According to an embodiment of the present invention, provided is a coating composition, containing:

(a) a polyhedral oligomeric silsesquioxane represented by the general formula (I);
(b) an acrylate polymer having a structural unit represented by the general formula (II); and
(c) a solvent for dissolving the polyhedral oligomeric silsesquioxane and the acrylate polymer:

General formula (I)

[Chem. 3]

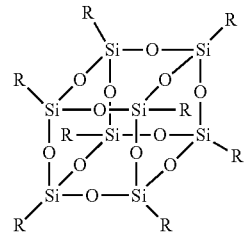

where R represents $-(CH_2)_2-(CF_2)_p-CF_3$, and p represents an integer of 0 to 9;

General formula (II)

[Chem. 4]

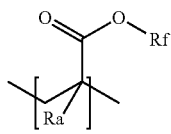

where Ra represents a hydrogen atom or a methyl group, Rf represents $-CH_2-(CF_2)_q-CF_3$ or $-CH(CF_3)_2$, and q represents an integer of 0 to 8.

The solvent may be an organic compound containing at least one of chlorine and fluorine.

According to an embodiment of the present invention, provided is a method of manufacturing a coated article, including a coating step of applying the coating composition to the surface of a substrate and removing the solvent.

The coating step can be carried out at a humidity of 30% RH or less.

The coating step can be carried out under a dehumidified atmosphere.

According to the present invention, a coating technology additionally excellent in, for example, water repellency, oil repellency, and ease of dirt removal is provided.

DESCRIPTION OF THE PREFERRED EMBODIMENTS

Figure 1A:
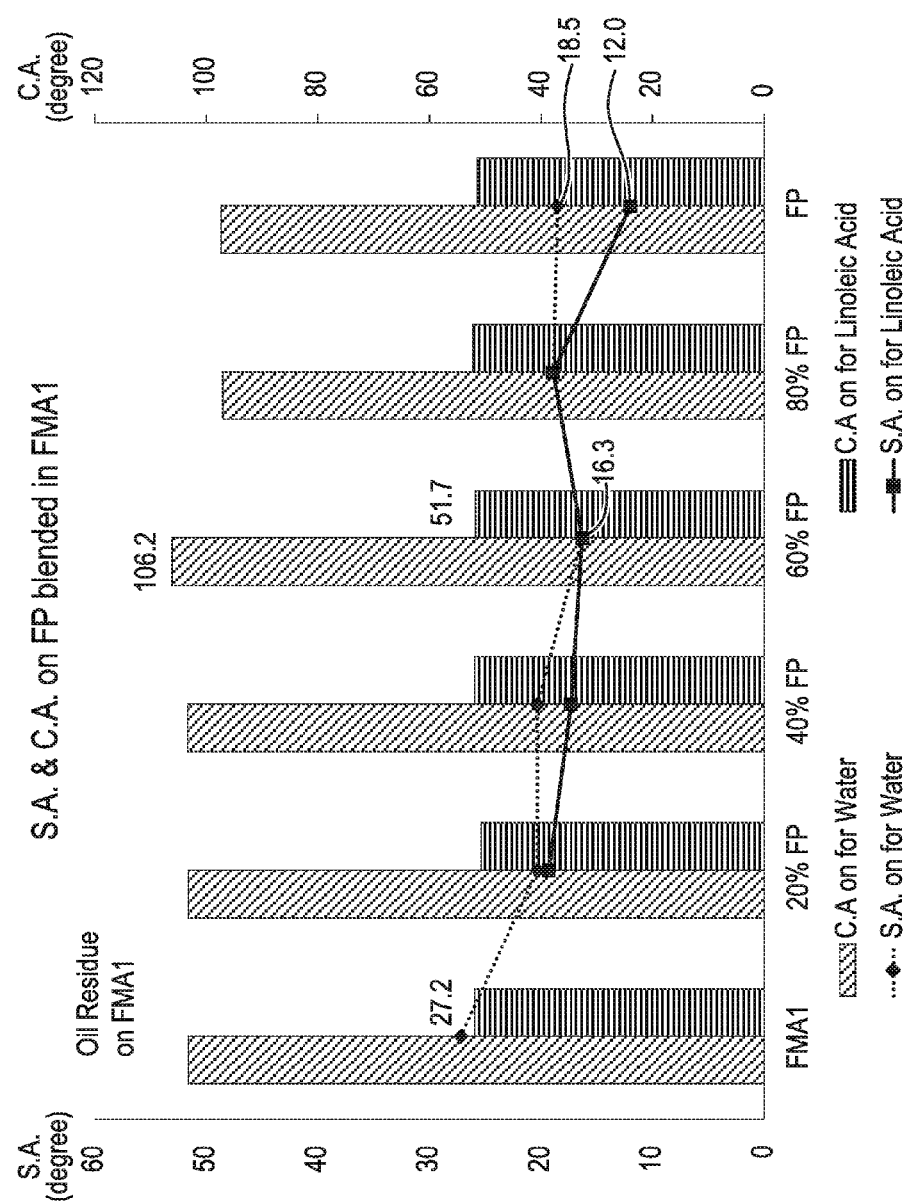
FIGS. 1A-1D are graphs showing relationships between proportions of a polyhedral oligomeric silsesquioxane FP contained and antifouling properties (contact angle and sliding angle) in the cases of using acrylate polymers FMA1, FMA2, FMA3, and FMA4.
Figure 1B:
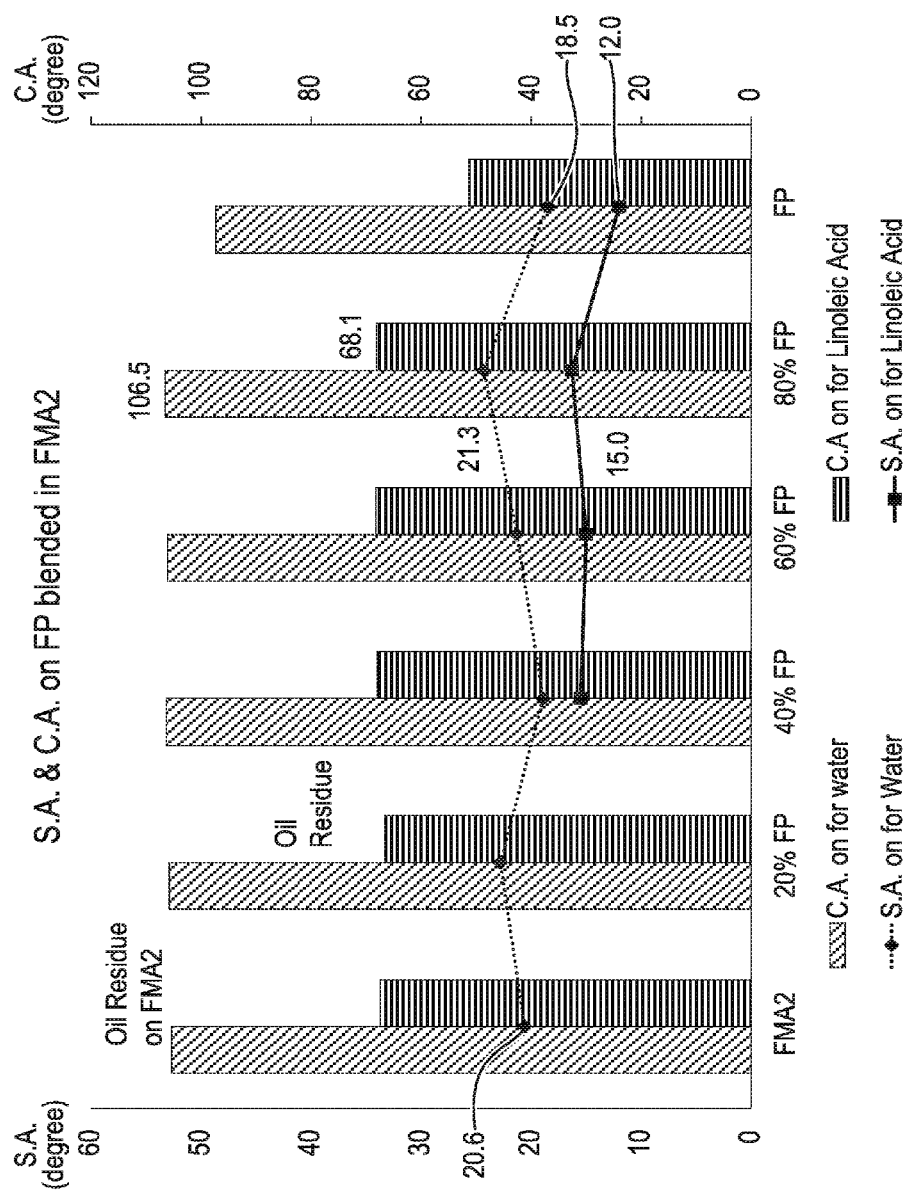
Figure 1C:
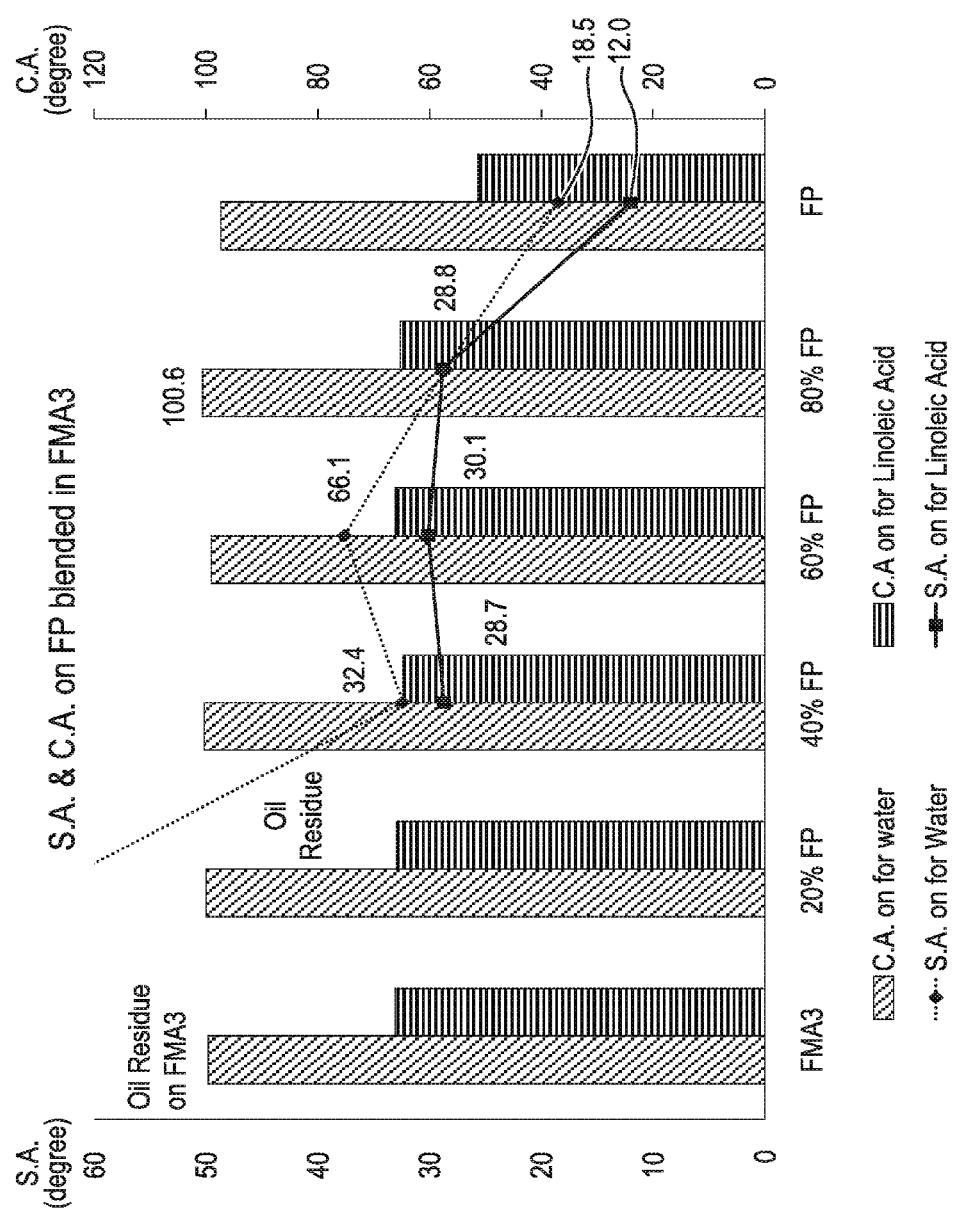
Figure 1D:
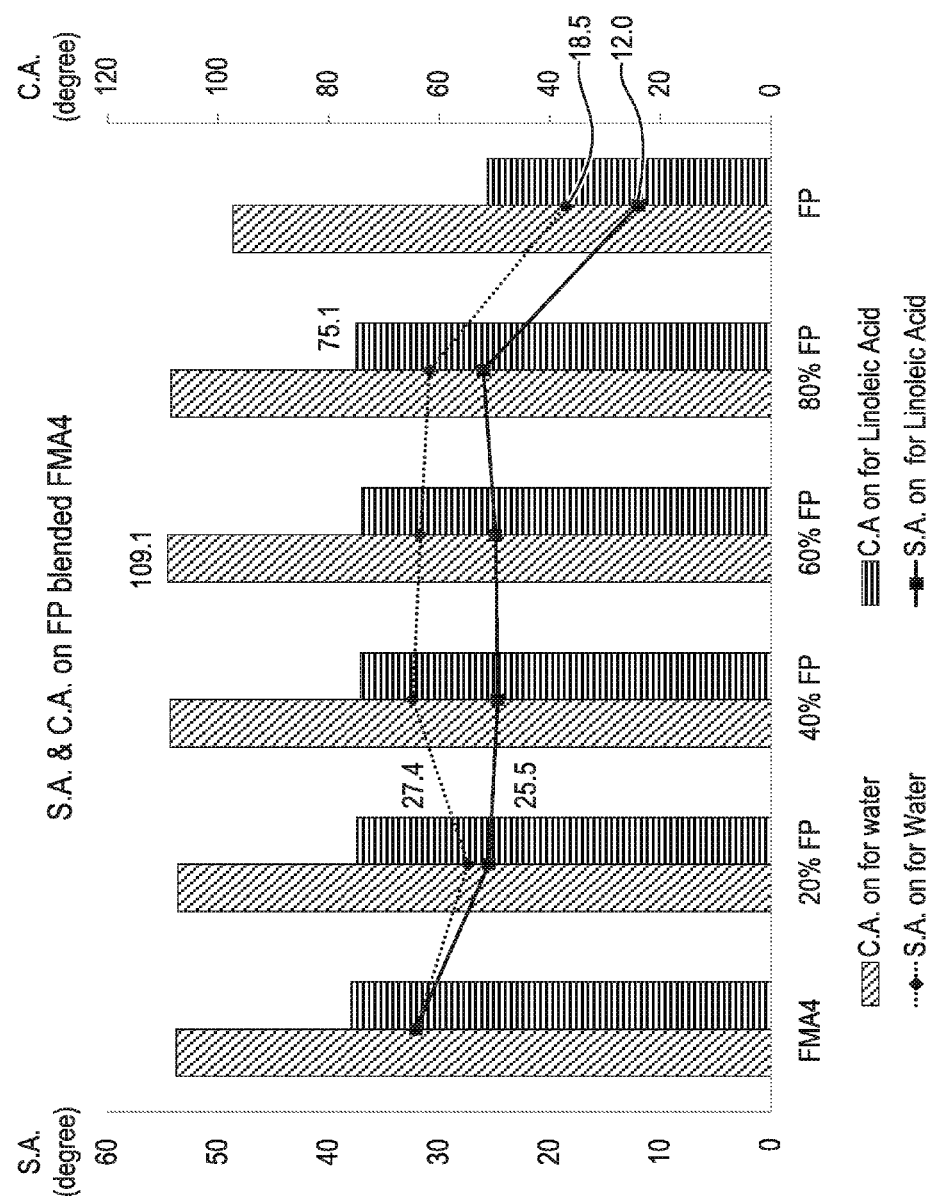
Figure 2A:
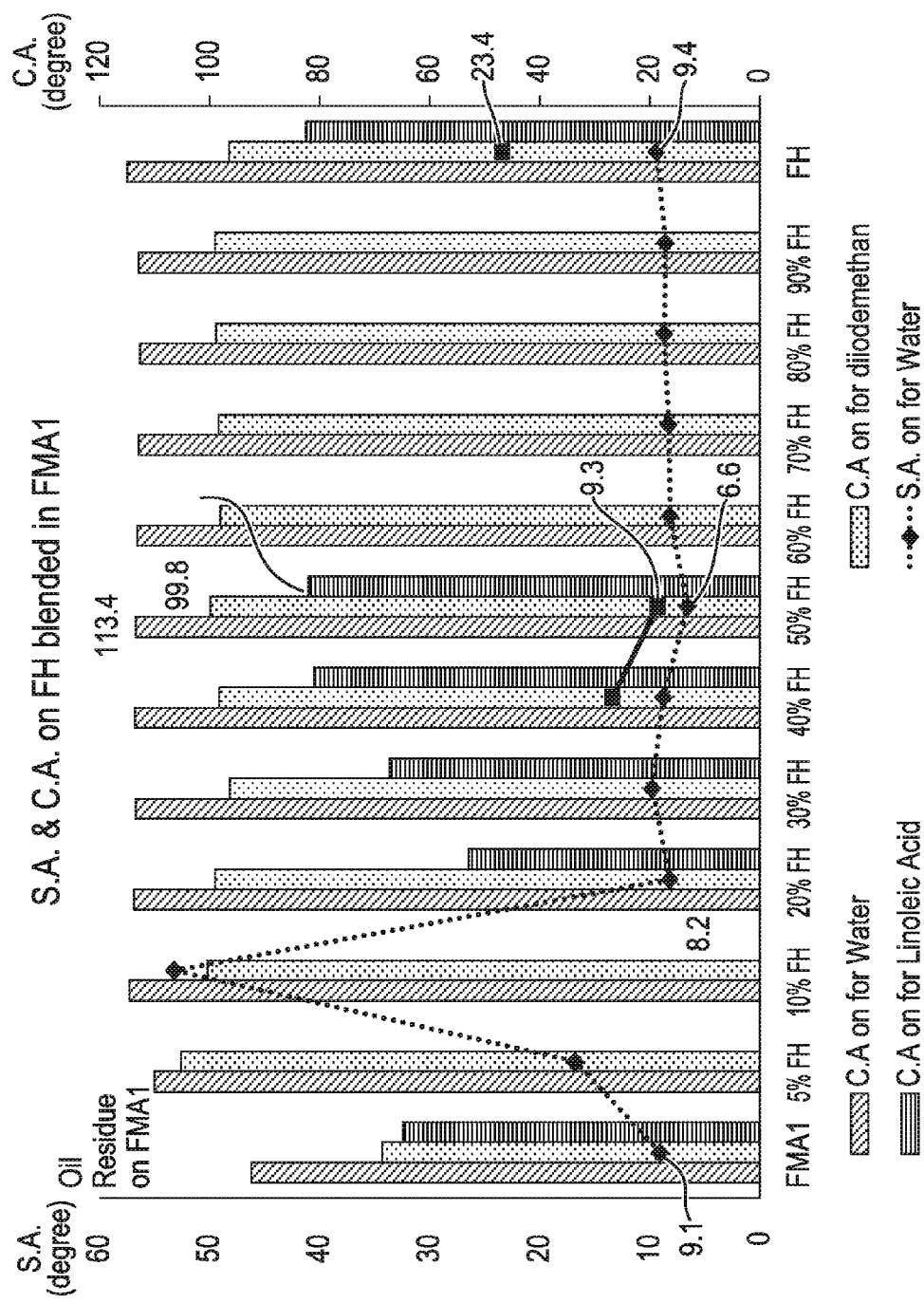
FIGS. 2A-2D are graphs showing relationships between proportions of a polyhedral oligomeric silsesquioxane FH contained and antifouling properties (contact angle and sliding angle) in the cases of using the acrylate polymers FMA1, FMA2, FMA3, and FMA4.
Figure 2B:
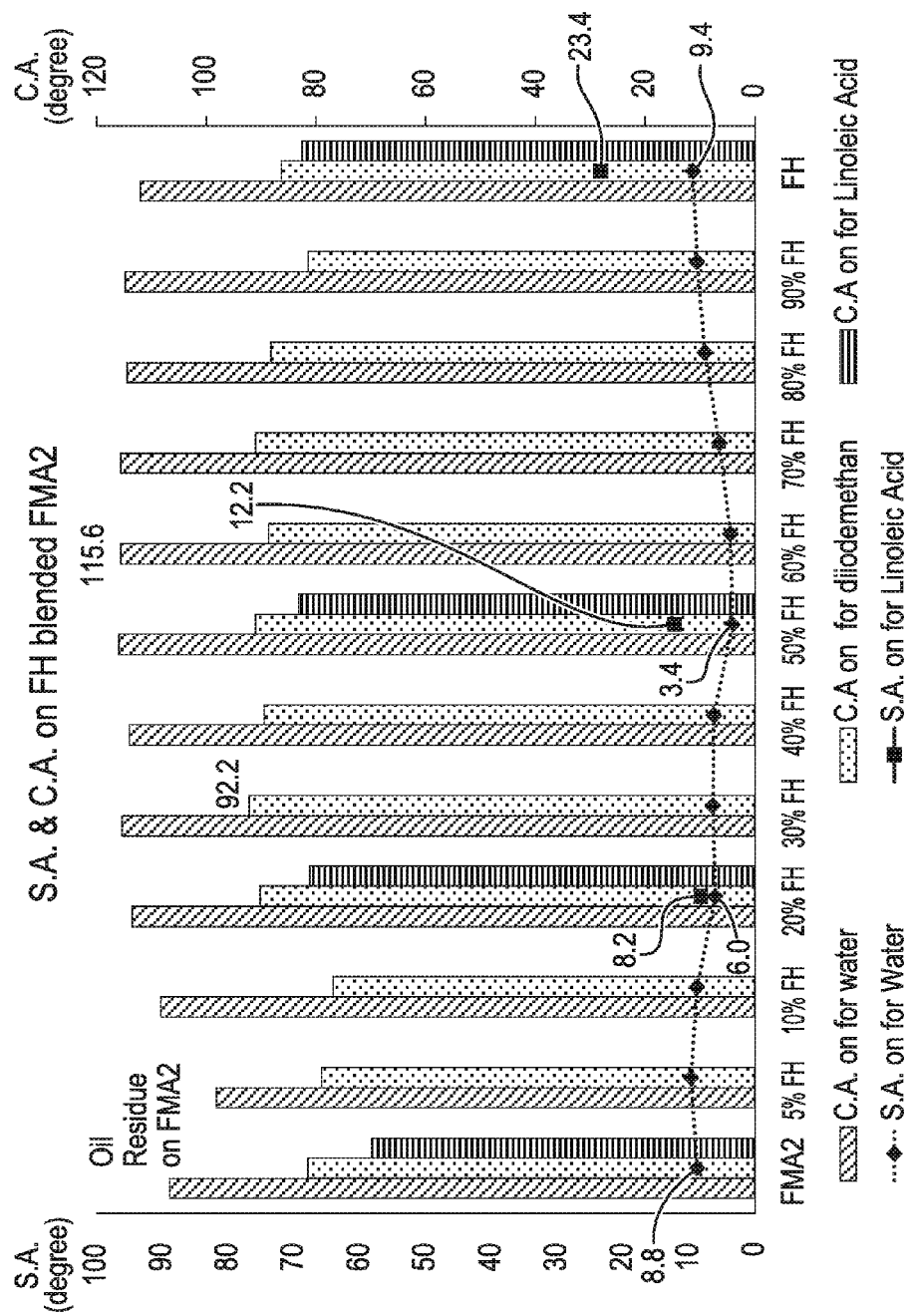
Figure 2C:
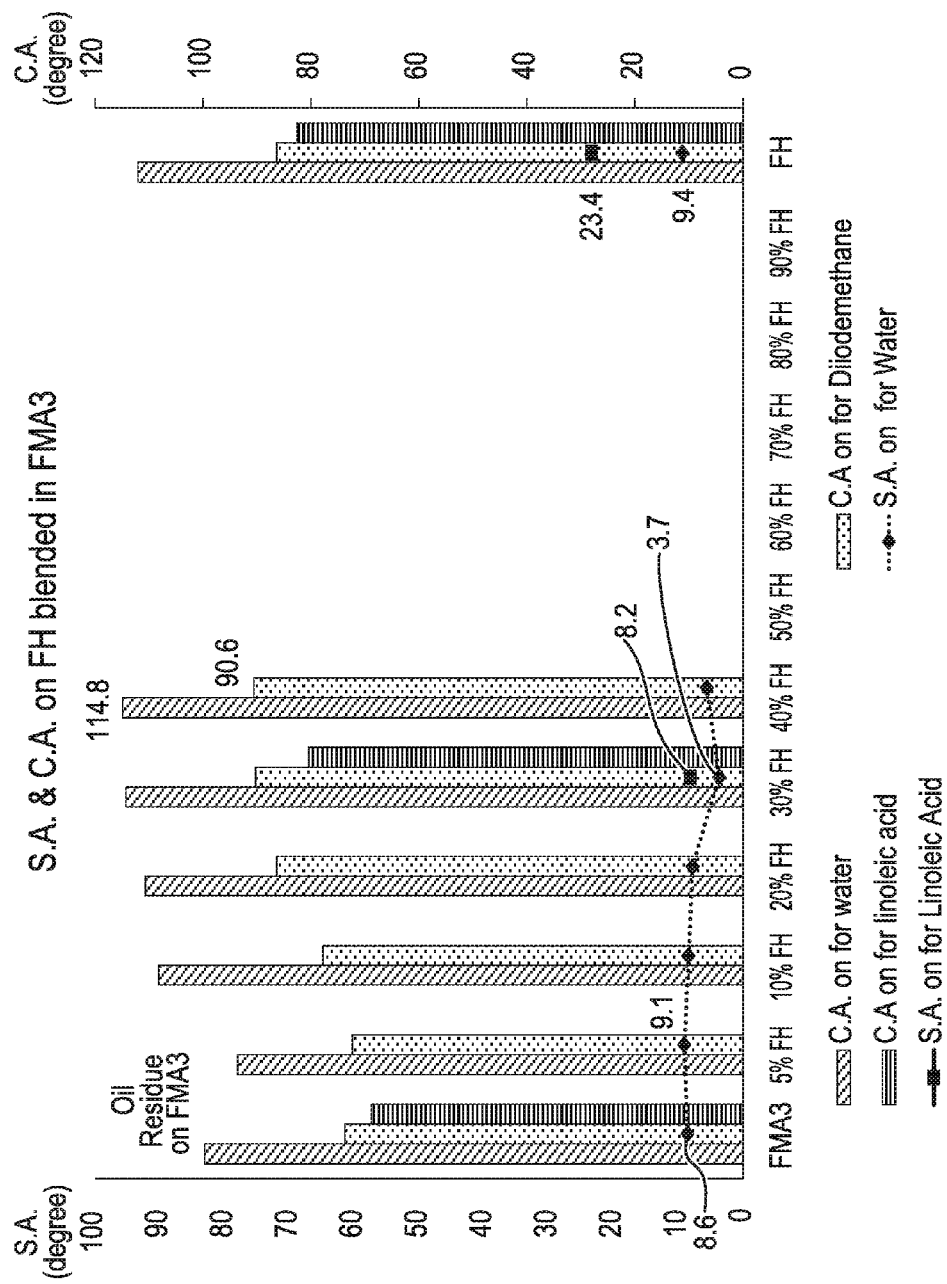
Figure 2D:
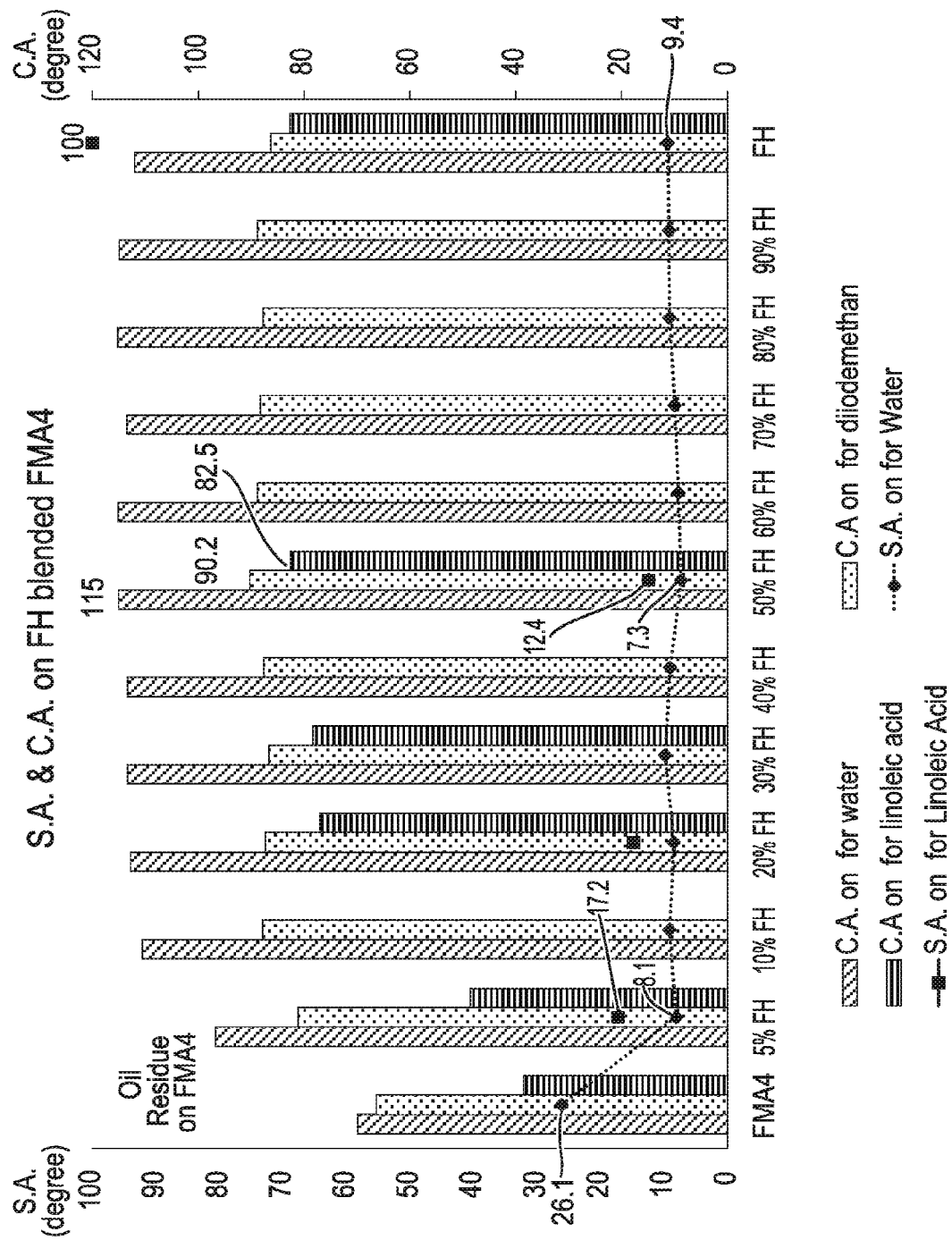
Figure 3A:
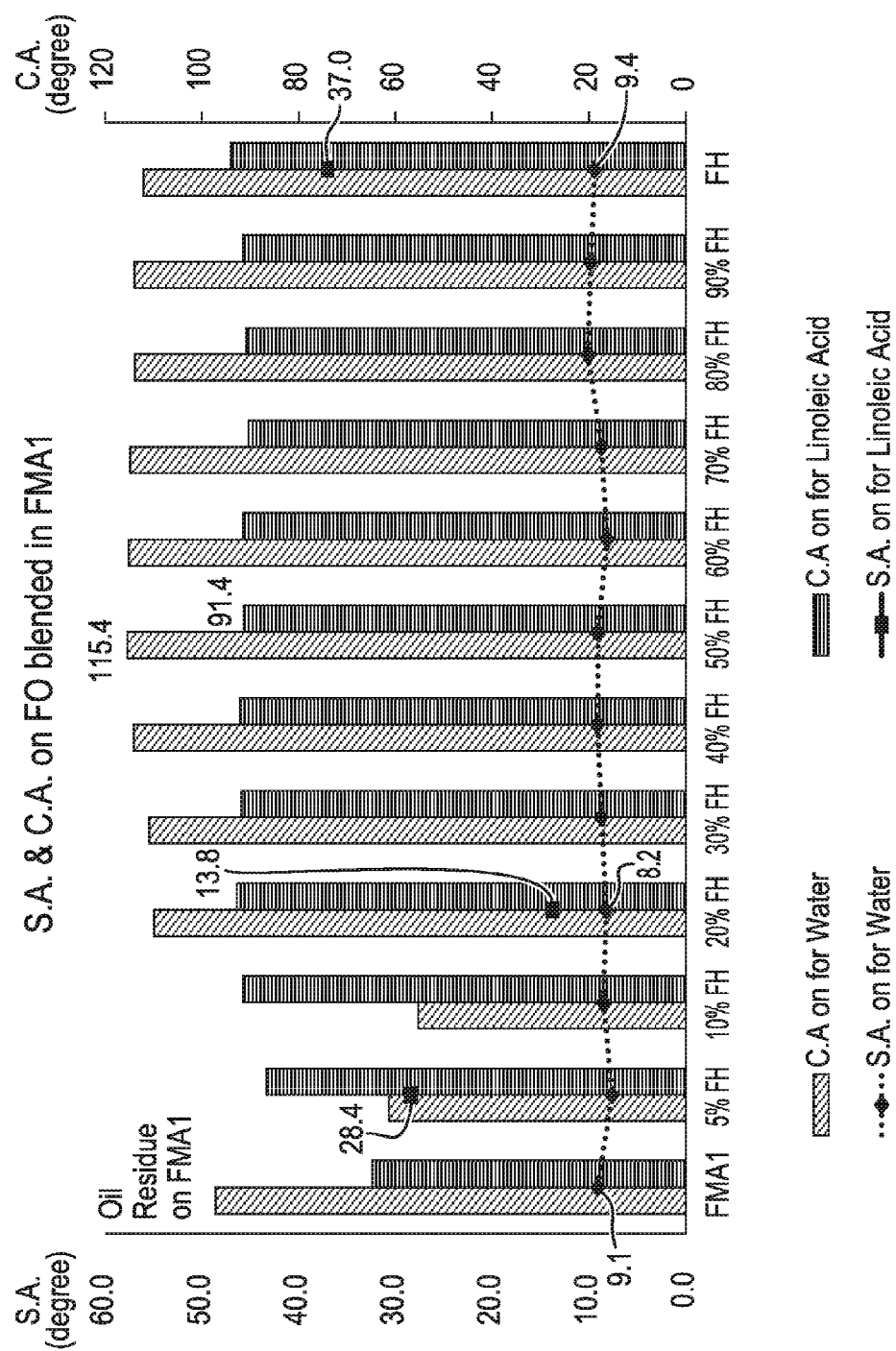
FIGS. 3A-3D are graphs showing relationships between proportions of a polyhedral oligomeric silsesquioxane FO contained and antifouling properties (contact angle and sliding angle) in the cases of using the acrylate polymers FMA1, FMA2, FMA3, and FMA4.
Figure 3B:
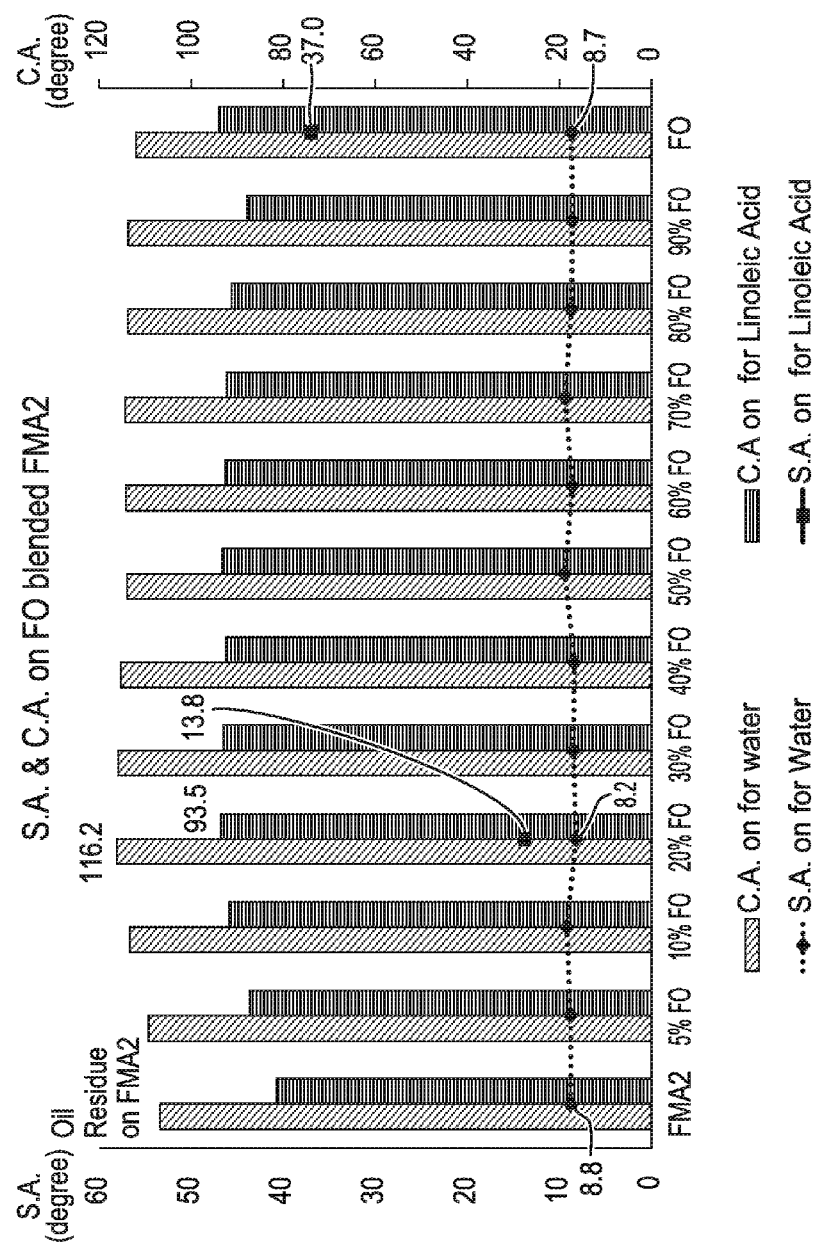
Figure 3C:
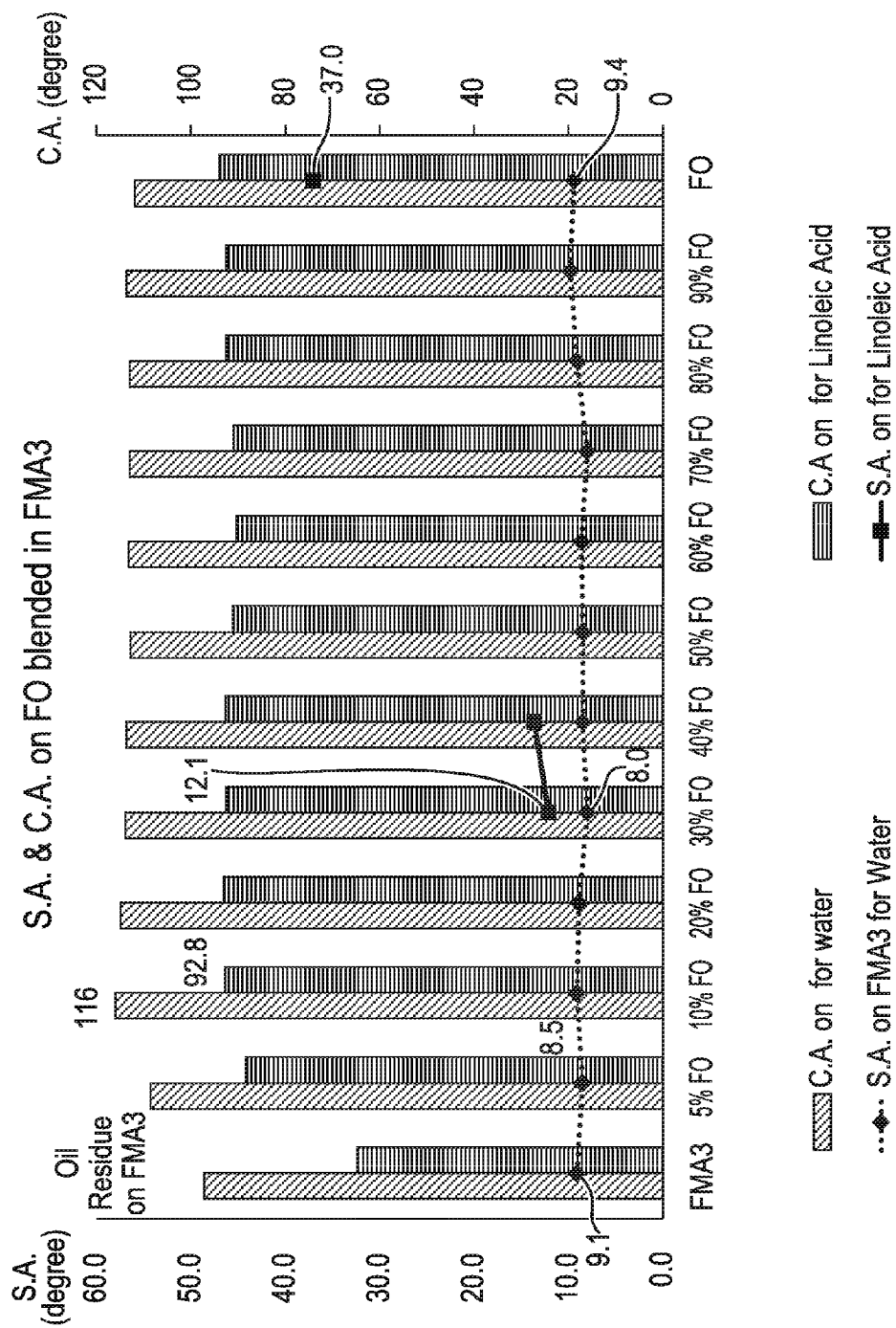
Figure 3D:
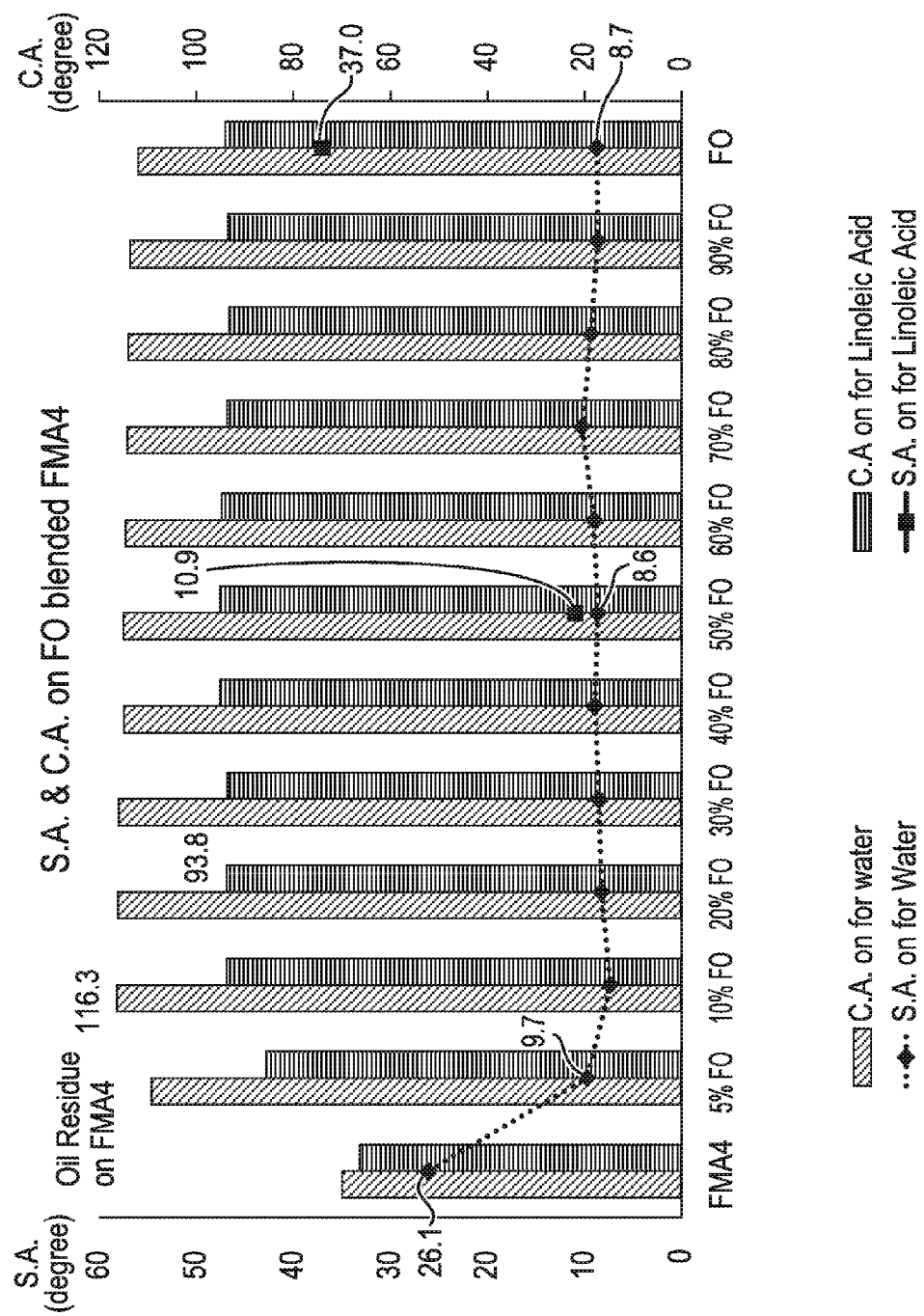

An article having a coating of the present invention is described.

In the article of the present invention, a coating film is applied to a substrate. The article of the present invention is used for parts required to have antifouling properties, such as: optical materials including lenses, prisms, optical filters to be used for optical equipments such as eye glasses or ophthalmic lenses, cameras, and microscopes; and films of display surfaces in display devices with touch panels. Therefore, the substrate is appropriately selected from, for example, glass, plastics, metals, and metal oxides depending on the intended use. For example, in the case of using a lens as the substrate, the substrate has an intended light transmittance and an intended refractive index. The preferred substrate for ophthalmic lenses in the method of the invention may be a treated or untreated synthetic glass formed of, for example, polythiourethane, polymethylmethacrylate (PMMA), polycarbonate, polyacrylate or polydiethylene glycol bisallyl carbonate.

Examples of the shape of the substrate include a plate, a sphere, a film, and a fiber.

The coating film (coating) to be applied on the article of the present invention contains:

(a) a polyhedral oligomeric silsesquioxane (referred to as "polyhedral oligomeric silsesquioxane (I)"); and (b) an acrylate polymer having a structural unit represented by the general formula (II) (referred to as "acrylate polymer (II)").

Polyhedral oligomeric silsesquioxane (I) can be represented by the general formula (I):

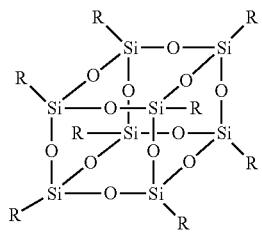

[Chem. 5]

where R represents $-(CH_2)_2-(CF_2)_p-CF_3$, and p represents an integer of 0 to 9.

The polyhedral oligomeric silsesquioxane (I) belongs to the compounds called POSS (trade name).

Examples of the polyhedral oligomeric silsesquioxane (I) include $(1H,1H,2H,2H\text{-trifluoropropyl})_8Si_8O_{12}$: FP, $(1H,1H,2H,2H\text{-pentafluorobutyl})_8Si_8O_{12}$, $(1H,1H,2H,2H\text{-heptafluoropentyl})_8Si_8O_{12}$, $(1H,1H,2H,2H\text{-nonafluorohexyl})_8Si_8O_{12}$: FH, $(1H,1H,2H,2H\text{-undecafluoroheptyl})_8Si_8O_{12}$, $(1H,1H,2H,2H\text{-tridecafluorooctyl})_8Si_8O_{12}$: FO, and $(1H,1H,2H,2H\text{-perfluorododecyl})_8Si_8O_{12}$.

Each of those polyhedral oligomeric silsesquioxanes (I) can be manufactured by a method disclosed in the known document (Joseph M. Mabry, et al., Angew. Chem. Int. Ed. 2008, 47 (22), 4137-4140, Scott T. Iacono, et al., Chem. Commun., 2007, 4992-4994).

Acrylate Polymer (II):

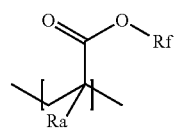

[Chem. 6]

where Ra represents a hydrogen atom or a methyl group, Rf represents $-CH_2-(CF_2)_q-CF_3$ or $-CH(CF_3)_2$, and q represents an integer of 0 to 8. The q is preferably an integer of 0 to 5.

The degree of polymerization is 2,000 to 10,000.

Examples of the acrylate polymer (II) include poly(2,2,2-trifluoroethyl methacrylate): FMA1, poly(2,2,3,3-tetrafluoropropyl methacrylate), poly(2,2,3,3,3-pentafluoropropyl methacrylate): FMA3, poly(2,2,3,3,4,4,4-heptafluorobutyl methacrylate): FMA4, poly(2,2,3,3,4,4,5,5-nonafluoropentyl methacrylate), poly(2,2,3,3,4,4,5,5,6,6-undecafluorohexyl methacrylate), poly(2,2,3,3,4,4,5,5,6,6,7,7,7-tridecafluoroheptyl methacrylate), poly(2,2,2-trifluoroethyl acrylate), poly(2,2,3,3-tetrafluoropropyl acrylate), poly(2,2,3,3,3-pentafluoropropyl acrylate), poly(2,2,3,3,4,4,4-heptafluorobutyl acrylate): FA4, poly(2,2,3,3,4,4,5,5-nonafluoropentyl acrylate), poly(2,2,3,3,4,4,5,5,6,6-undecafluorohexyl acrylate), poly(2,2,3,3,4,4,5,5,6,6,7,7-tridecafluoroheptyl acrylate), poly(1,1,1,3,3,3-hexafluoroisopropyl methacrylate): FMA2, and poly(1,1,1,3,3,3-hexafluoroisopropylacrylate). Two or more kinds of those acrylate polymers may be used in combination.

Any commercially available acrylate polymer may be used as the acrylate polymer (II).

The coating film preferably contains the polyhedral oligomeric silsesquioxane (I) at least in a proportion X relative to the total components in the coating film. Here, the proportion X refers to, in "profile where as the proportion of the polyhedral oligomeric silsesquioxane increases, the liquid droplet sliding angle on the surface of the coating film decreases (or temporarily increases and then decreases), but a change in the decrease becomes smaller," a proportion at a starting point at which the change gradually becomes smaller.

When the polyhedral oligomeric silsesquioxane (I) is contained in a proportion equal to or larger than the proportion X, a contact film that has sufficiently large contact angles and sufficiently small sliding angles for both water and oil, and is excellent in antifouling property is produced.

Detailed descriptions are made. Evaluation of the antifouling property of the surface can be carried out based on a liquid droplet contact angle and liquid droplet sliding angle for water and oil (polar liquid and non-polar liquid). According to the evaluation method to examine relationships between the proportion of the polyhedral oligomeric silsesquioxane (I) in the coating film, and the liquid droplet contact angle and the liquid droplet sliding angle, the following results are obtained. As the proportion of the polyhedral oligomeric silsesquioxane (I) increases, the liquid droplet contact angle becomes larger. On the other hand, as the proportion increases, the liquid droplet sliding angle gradually decreases (or temporarily increases and then decreases in a curved line) and tends to show no abrupt change even if the proportion increases more.

Therefore, in order to achieve a sufficiently large liquid droplet contact angle and a sufficiently small liquid droplet sliding angle for improving the antifouling property, the coating film is preferably configured so as to contain the polyhedral oligomeric silsesquioxane (I) at least in a proportion X at a starting point at which the change in the liquid droplet sliding angle becomes smaller.

The proportion X varies depending on the type of the polyhedral oligomeric silsesquioxane (I) and the type of the acrylate polymer (II), but can be determined by examining a relationship between the composition ratio and the liquid droplet sliding angle, taking transmittance and production cost into consideration. For example, in the cases where the polyhedral oligomeric silsesquioxanes are FP, FH, and FO, the proportions are as described below.

<Case of Polyhedral Oligomeric Silsesquioxane (FP)>

In the case where the acrylate polymer (II) is FMA1 above, the proportion of the polyhedral oligomeric silsesquioxane (FP) can be 20 wt % or more and is preferably 60 wt % or more. The proportion of the polyhedral oligomeric silsesquioxane (FP) relative to 1 mol of a monomer that is a structural unit of the acrylate polymer (II) can be 0.04 mol or more and is preferably 0.23 mol or more.

In the case where the acrylate polymer (II) is FMA2 above, the proportion of the polyhedral oligomeric silsesquioxane (FP) can be 40 wt % or more and is preferably 80 wt % or more. The proportion of the polyhedral oligomeric silsesquioxane (FP) relative to 1 mol of a monomer that is a structural unit of the acrylate polymer (II) can be 0.14 mol or more and is preferably 0.84 mol or more.

In the case where the acrylate polymer (II) is FMA3 above, the proportion of the polyhedral oligomeric silsesquioxane (FP) can be 40 wt % or more and is preferably 80 wt % or more. The proportion of the polyhedral oligomeric silsesquioxane (FP) relative to 1 mol of a monomer that is a structural unit of the acrylate polymer (II) can be 0.13 mol or more and is preferably 0.78 mol or more.

In the case where the acrylate polymer (II) is FMA4 above, the proportion of the polyhedral oligomeric silsesquioxane (FP) can be 20 wt % or more and is preferably 80 wt % or more. The proportion of the polyhedral oligomeric silsesquioxane (FP) relative to 1 mol of a monomer that is a structural unit of the acrylate polymer (II) can be 0.06 mol or more, and is preferably 0.35 mol or more, more preferably 0.95 mol or more.

<Case of Polyhedral Oligomeric Silsesquioxane (FH)>

In the case where the acrylate polymer (II) is FMA1 above, the proportion of the polyhedral oligomeric silsesquioxane (FH) can be 20 wt % or more and is preferably 60 wt % or more. The proportion of the polyhedral oligomeric silsesquioxane (FH) relative to 1 mol of a monomer that is a structural unit of the acrylate polymer (II) can be 0.019 mol or more and is preferably 0.114 mol or more.

In the case where the acrylate polymer (II) is FMA2 above, the proportion of the polyhedral oligomeric silsesquioxane (FH) can be 20 wt % or more, and is preferably 50 wt % or more, more preferably 70 wt % or more. The proportion of the polyhedral oligomeric silsesquioxane (FH) relative to 1 mol of a monomer that is a structural unit of the acrylate polymer (II) can be 0.024 mol or more, and is preferably 0.099 mol or more, more preferably 0.15 mol or more.

In the case where the acrylate polymer (II) is FMA3 above, the proportion of the polyhedral oligomeric silsesquioxane (FH) can be 30 wt % or more and is preferably 40 wt % or more. The proportion of the polyhedral oligomeric silsesquioxane (FH) relative to 1 mol of a monomer that is a structural unit of the acrylate polymer (II) can be 0.042 mol or more, and is preferably 0.065 mol or more.

In the case where the acrylate polymer (II) is FMA4 above, the proportion of the polyhedral oligomeric silsesquioxane (FH) can be 5 wt % or more and is preferably 50 wt % or more. The proportion of the polyhedral oligomeric silsesquioxane (FH) relative to 1 mol of a monomer that is a structural unit of the acrylate polymer (II) can be 0.0062 mol or more, and is preferably 0.118 mol or more.

In the case where the acrylate polymer (II) is FA4, the proportion of the polyhedral oligomeric silsesquioxane (FH) may be 60 wt % or more, and is preferably 70 wt % or more, more preferably 80 wt % or more. The proportion of the polyhedral oligomeric silsesquioxane (FH) relative to 1 mol of a monomer that is a structural unit of the acrylate polymer (II) can be 0.114 mol or more, and is preferably 0.178 mol or more, more preferably 0.685 mol or more.

<Case of Polyhedral Oligomeric Silsesquioxane (FO)>

In the case where the acrylate polymer (II) is FMA1 above, the proportion of the polyhedral oligomeric silsesquioxane (FO) can be 5 wt % or more and is preferably 20 wt % or more. The proportion of the polyhedral oligomeric silsesquioxane (FO) relative to 1 mol of a monomer that is a structural unit of the acrylate polymer (II) can be 0.003 mol or more and is preferably 0.014 mol or more.

In the case where the acrylate polymer (II) is FMA2 above, the proportion of the polyhedral oligomeric silsesquioxane (FO) can be 5 wt % or more and is preferably 20 wt % or more. The proportion of the polyhedral oligomeric silsesquioxane (FO) relative to 1 mol of a monomer that is a structural unit of the acrylate polymer (II) can be 0.0041 mol or more and is preferably 0.020 mol or more.

In the case where the acrylate polymer (II) is FMA3 above, the proportion of the polyhedral oligomeric silsesquioxane (FO) can be 5 wt % or more and is preferably 30 wt % or more. The proportion of the polyhedral oligomeric silsesquioxane (FO) relative to 1 mol of a monomer that is a structural unit of the acrylate polymer (II) can be 0.004 mol or more and is preferably 0.03 mol or more.

In the case where the acrylate polymer (II) is FMA4 above, the proportion of the polyhedral oligomeric silsesquioxane (FO) can be 5% or more and is preferably 50% or more. The proportion of the polyhedral oligomeric silsesquioxane (FO) relative to 1 mol of a monomer that is a structural unit of the acrylate polymer (II) can be 0.005 mol or more, and is preferably 0.09 mol or more, more preferably 0.35 mol or more.

The coating film may have a surface arithmetic mean roughness of 2.5 nm or less, preferably 1.8 nm or less.

Further, the coating film can have water repellency and oil repellency in which a sliding angle for linoleic acid is 4.0 degree or less and a sliding angle for pure water is 4.0 degrees or less. Preferably, the coating film can have water repellency and oil repellency in which a sliding angle for linoleic acid is 1.0 degree or less and a sliding angle for pure water is 2.0 degrees or less.

In addition, in the case where the article of the present invention is used as an optical material, the coating film (or article having a coating film) can have a transmittance or 93% or more to light having a wavelength of 400 to 850 nm.

(Manufacturing Method)

Next, a method of manufacturing a coated article of the present invention is described.

The article of the present invention can be prepared by applying a coating composition serving as a precursor to a substrate and removing a solvent. As mentioned above, the type of the substrate is appropriately selected depending on the intended use of the article.

(Coating Composition)

A coating composition contains:
(a) the above-mentioned polyhedral oligomeric silsesquioxane (I);
(b) the above-mentioned acrylate polymer (II); and
(c) a solvent for dissolving the polyhedral oligomeric silsesquioxane (I) and the acrylate polymer (II).

The solvent is not particularly limited as long as the solvent can dissolve the polyhedral oligomeric silsesquioxane (I) and the acrylate polymer (II), and the coating film formed after removal of the solvent exhibits a characteristic of interest.

The solvent is an organic compound containing at least one of chlorine and fluorine, such as 1,3-dichloro-1,1,2,2,3-pentafluoropropane or 1,3-bis(trifluoromethyl)benzene. The solvents may be mixed before use. AK-225 manufactured by Asahi Glass Co., Ltd., or 3M™ FC-72 Fluorinert™, 3M™ FC-40 Fluorinert™, or 3M™ Novec™ 7200 acetone manufactured by 3M can be used as a commercially available product of the solvent.

As mentioned above, the coating film formed preferably contains the polyhedraloligomericsilsesquioxane (I) at least in a proportion X. As mentioned above, the proportion X refers to, in "profile where as the proportion of the polyhedral oligomeric silsesquioxane increases, the liquid droplet sliding angle on the surface of the coating film decreases or temporarily increases and then decreases, but a change in the decrease gradually becomes smaller," a proportion at a starting point at which the change becomes smaller.

Therefore, the coating composition is prepared so as to contain the polyhedral oligomeric silsesquioxane (I) at least in the proportion X.

The method of preparing the coating composition is not particularly limited. For example, first, a mixed solution of the polyhedral oligomeric silsesquioxane (I) and a solvent, and a mixed solution of the acrylate polymer (II) and a solvent are separately prepared. After that, the two solutions are mixed in a predetermined proportion so that the polyhedral oligomeric silsesquioxane (I) and the acrylate polymer (II) are contained in a desired proportion. Thus, the coating composition is obtained.

For example, a solution A containing 0.5 wt % of the polyhedral oligomeric silsesquioxane (I) in a solvent and a solution B containing 0.5 wt % of the acrylate polymer (II) in a solvent are separately prepared. In the case of preparing a coating film containing the polyhedral oligomeric silsesquioxane (I) in the proportion X wt %, the solution A and the solution B may be mixed at a ratio of X wt %:(100−X) wt % to prepare the coating composition.

Examples of a method of applying the coating composition to the substrate include dipping, brush application, spin coating, and roll coating. In view of, for example, uniformity of the film thickness, the spin coating, dip coating, and the like are preferably employed.

After the application step, the solvent is removed by sufficiently drying the resultant. Thus, the coating film is obtained.

Here, when moisture in air is adsorbed to the coating composition in formation of the coating film, dimples appear on the surface structure, resulting in exhibiting a pinning effect. The pinning effect refers to a phenomenon where when a liquid droplet approaches a solid having a surface with an angulated flexion, the irregularity inhibits the movement, resulting in preventing the droplet from moving from the position. The pinning effect increases the liquid droplet sliding angle and inhibits removal of dirt adsorbed.

Therefore, in order to reduce the pinning effect, the application step and the drying step may be carried out in an atmosphere of a relative humidity of 30% RH or less.

The application and drying can be carried out in a dehumidified atmosphere formed by circulating a nitrogen gas (inert gas) through a dryer (such as molecular sieve), for example.

Embodiments of the present invention have been described above.

EXAMPLES

The present invention is described in more detail by way of examples. However, the present invention is not limited to the examples.

Examples 1 to 3 were carried out to examine relationships between proportions of polyhedral oligomeric silsesquioxanes (I) in coating films, and contact angles and sliding angles. Example 4 was carried out to examine an effect of humidity on formation of a coating film.

It should be noted that the polyhedral oligomeric silsesquioxanes FP, FH, and FO used were synthesized by the following method.

Synthesis of FH:

A solution of 1H,1H,2H-nonafluorohexyltriethoxysilane (2.1 g) (manufactured by Fluorochem Ltd.) in ethanol (5 ml) was added to KOH (2.4 mM) dissolved in deionized water (135 mg) at room temperature. After continuous stirring for 24 hours, a white precipitate was taken by filtration and washed repeatedly with ethanol. The solid was collected and dissolved in 1,3-dichloro-1,1,2,2,3-pentafluoropropane (ASAHIKLIN AK-225G), and residual KOH was removed by washing with deionized water. The organic layer was dried with $MgSO_4$, filtered, concentrated, and dried under vacuum to afford a product (1H,1H,2H,2H-nonafluorohexyl)$_8Si_8O_{12}$ (FH) as a white solid in nearly quantitative yield.

FO was synthesized in a similar manner using 1H,1H,2H,2H-tridecafluorooctyltriethyoxysilane (manufactured by Fluorochem Ltd.).

Synthesis of FP

Hepta(3,3,3-trifluoropropyl)tricycloheptasiloxane trisodium silanolate (4 g, 3.69 mmol) was dissolved in dried THF (70 ml, 0.05 M). To the stirred solution, 3,3,3-trifluoropropyltrichlorosilane (0.871 ml, 5.25 mmol) was added at room temperature, and immediately after that, triethylamine (0.488 ml, 3.5 mmol) was added dropwise to the mixture. The reaction mixture was stirred at room temperature for overnight and then subjected to filtration to remove the white precipitate, and the filtrate was concentrated under reduced pressure to obtain a crude product. The resultant crude product was suspended in methanol. The resultant precipitate was recovered by filtration, washed repeatedly with methanol, and then dried at room temperature to obtain the intended compound as a white solid (1.71 g, 2.25 mmol, 78.1% yield).

Example 1a

FP+FMA1

Solution A:

A solution A having an FP content of 0.5 wt % was prepared using (1H, 1H, 2H, 2H-trifluoropropyl)$_8$Si$_8$O$_{12}$ represented by the following chemical formula and 1,3-dichloro-1,1,2,2,3-pentafluoropropane (manufactured by Asahi Glass Co., Ltd., product name: ASAHIKLIN AK-225) as the solvent.

[Chem. 7]

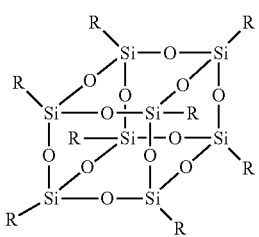

(R = CH$_2$CH$_2$CF$_3$)

Solution B:

A solution B having an FMA1 content of 0.5 wt % was prepared using poly(2,2,2-trifluoroethyl methacrylate) (FMA1: manufactured by Sigma-Aldrich Co., product number 591963) represented by the following chemical formula as the acrylate polymer (II) and 1,3-dichloro-1,1,2,2,3-pentafluoropropane (manufactured by Asahi Glass Co., Ltd., product name: ASAHIKLIN AK-225) as the solvent.

[Chem. 8]

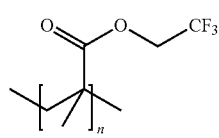

Coating compositions having FH contents of 5 to 90 wt % were prepared by changing the mixing ratio of the solution A to the solution B.

The resultant coating composition was applied to a silicon wafer using a spin coater (10 seconds at 450 rpm, 30 seconds at 900 rpm) and dried at room temperature for 2 hours. It should be noted that, in the application step, the ambient temperature was 23 deg C. (degrees Celsius), and the relative humidity was 30%.

For the contact angles for pure water, diiodomethane, and linoleic acid of the coating film thus prepared, the contact angles in the case of placing 2 microliter of a liquid droplet to be measured on the surface of the coating film set horizontally were measured. In addition, the sliding angles for pure water and linoleic acid were measured as described below. First, 20 microliter of a liquid droplet of pure water or linoleic acid were placed on the surface of the coating film. One second later, the substrate having the coating was continuously tilted at a rate of 1 degree per second, and the angle at which the movement of the liquid droplet by 100 micrometer or more was confirmed was defined as the sliding angle. An automatic measurement device (trade name: "DM-701," Kyowa Interface Science Co., Ltd.) was used for the measurement.

Example 1b

FP+FMA2

The same experiment as that in Example 1a above was carried out except that poly(1,1,1,3,3,3-hexafluoroisopropyl methacrylate) (FMA2: manufactured by Sigma-Aldrich Co., product number 591327) represented by the following chemical formula was used as the acrylate polymer (II).

[Chem. 9]

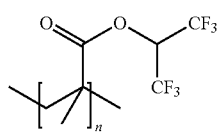

Example 1c

FP+FMA3

The same experiment as that in Example 1a above was carried out except that poly(2,2,3,3,3-pentafluoropropyl methacrylate) (FMA3: manufactured by Sigma-Aldrich Co., product number 592080) represented by the following chemical formula was used as the acrylate polymer (II).

[Chem. 10]

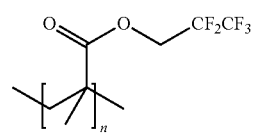

Example 1d

FP+FMA4

The same experiment as that in Example 1a above was carried out except that poly(2,2,3,3,4,4,4-heptafluorobutyl methacrylate) (FMA4: manufactured by Sigma-Aldrich Co., product number 591971) represented by the following chemical formula was used as the acrylate polymer (II).

[Chem. 11]

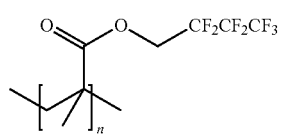

<Results of Evaluation in Examples 1a to 1d>

FIGS. 1A-1D are graphs showing relationships between proportions of the polyhedral oligomeric silsesquioxane FP contained and antifouling properties (contact angle and sliding angle) in Examples 1a to 1d.

The contact angles were improved with increasing proportion of the polyhedral oligomeric silsesquioxane FP contained. On the other hand, the sliding angle was found to decrease with increasing proportion of polyhedral oligomeric silsesquioxane FP contained and then change little even when the proportion of the oligomer increased.

Example 2a

FH+FMA1

The same experiment as that in Example 1a above was carried out except that (1H, 1H, 2H, 2H-nonafluorohexyl)$_8$Si$_8$O$_{12}$ represented by the following chemical formula was used as the polyhedral oligomeric silsesquioxane in the solution A.

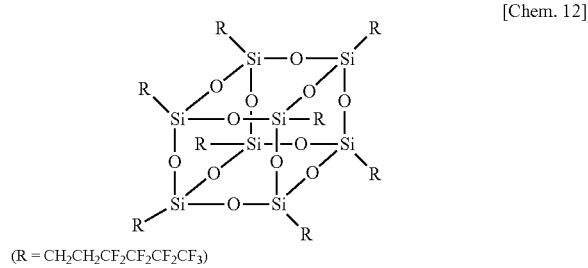

[Chem. 12]

(R = CH$_2$CH$_2$CF$_2$CF$_2$CF$_2$CF$_3$)

The film thickness of the coating film was measured with cut cross-section observation by Scanning Electron Microscope (Hitachi SU1510) and was found to be 20.5 nm.

Figure 5:
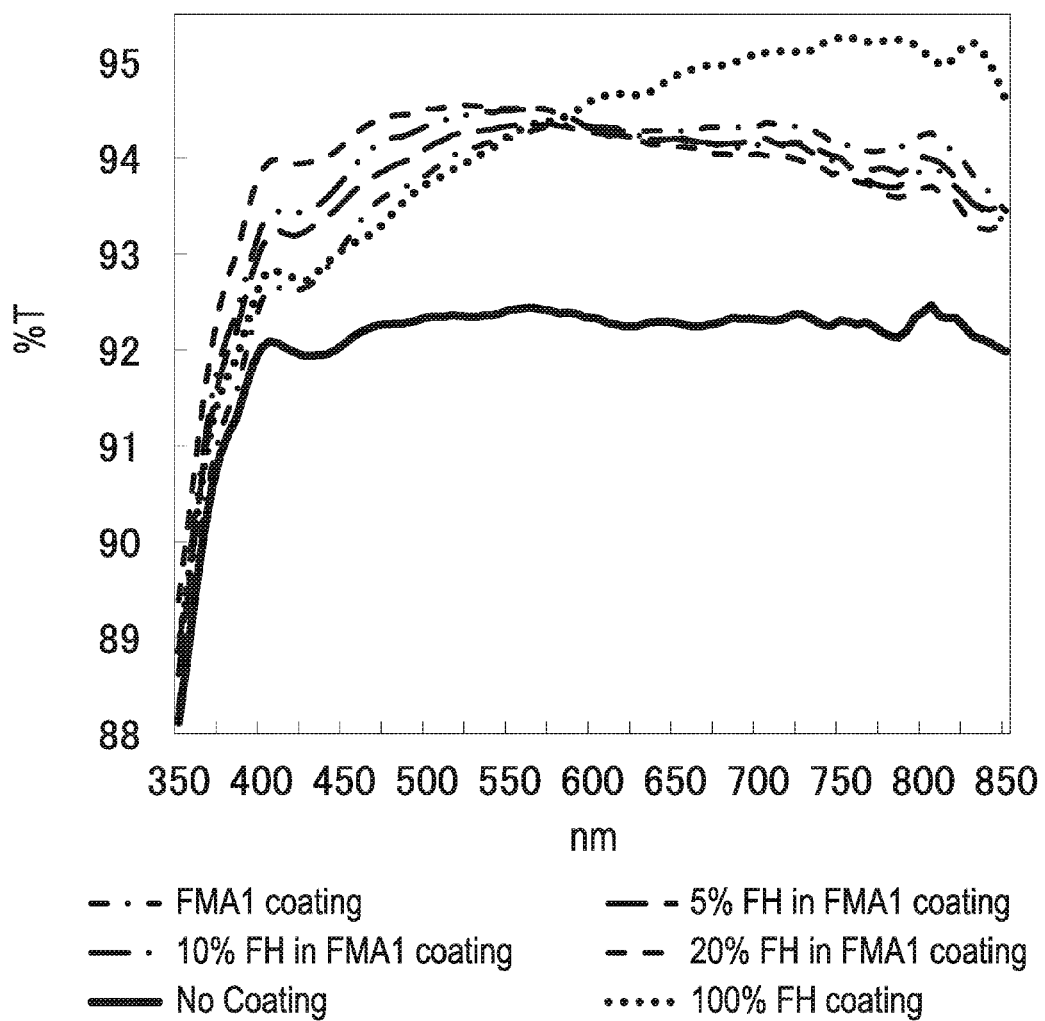
FIG. 5 is a graph showing transmittances of glass articles on which coating films have been formed.
Figure 6A:
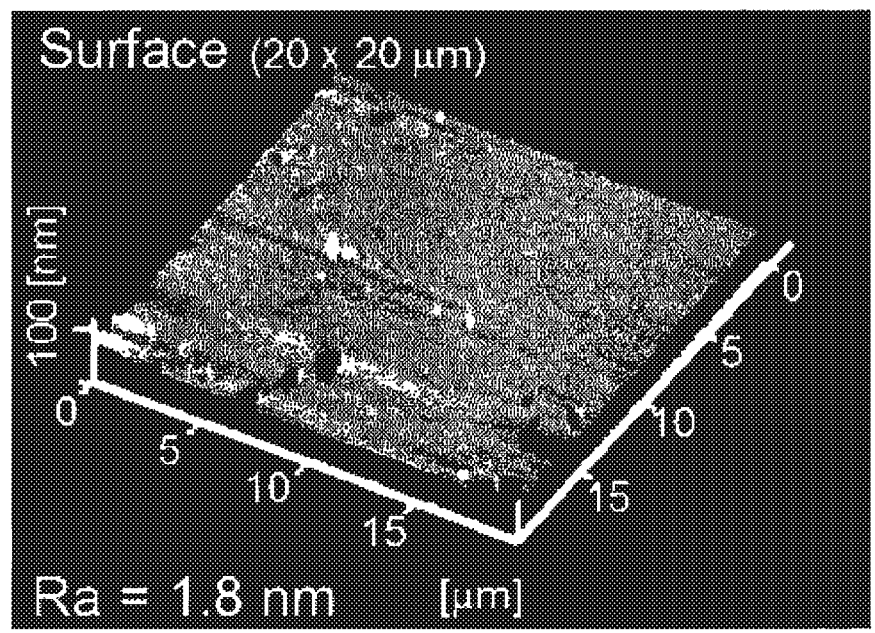
FIGS. 6A-6D are SPM images.
Figure 6B:
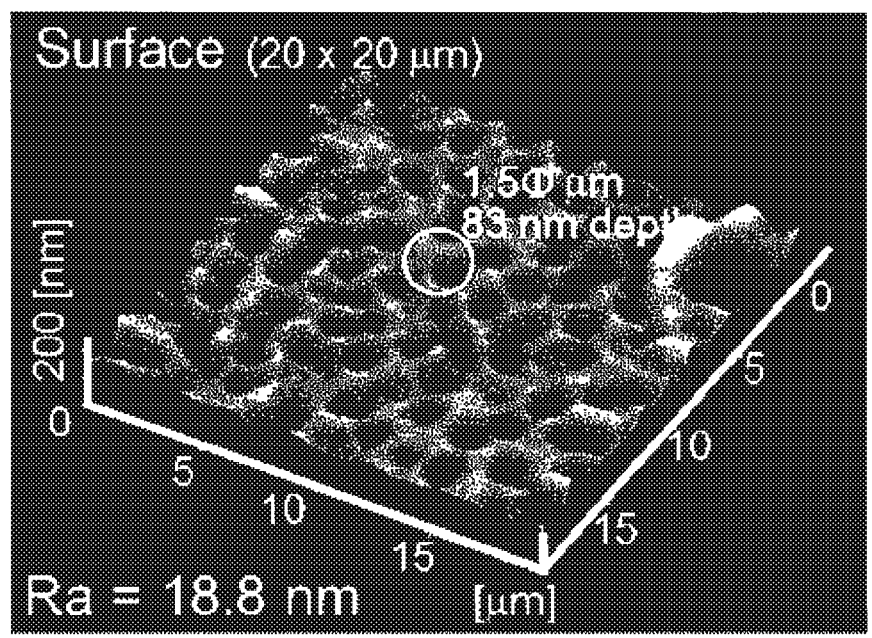
Figure 6C:
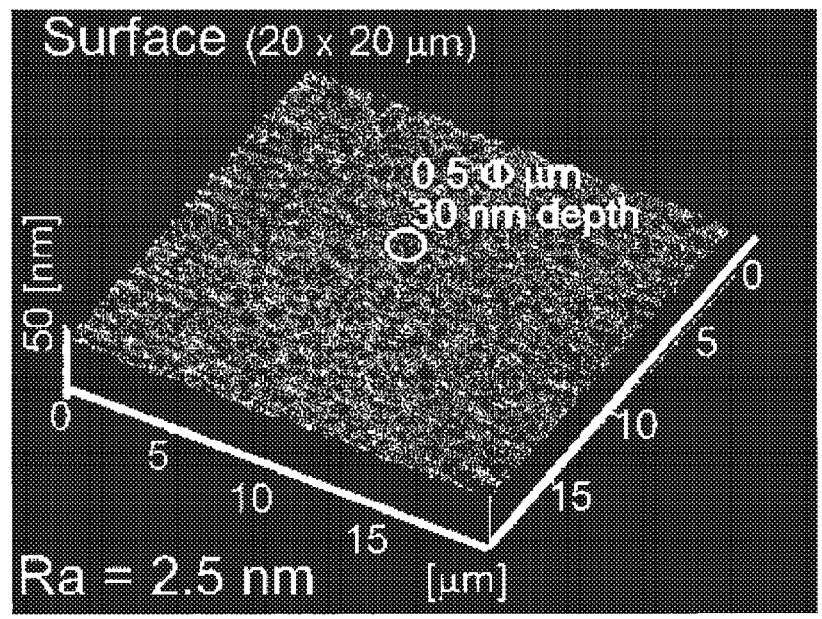
Figure 6D:
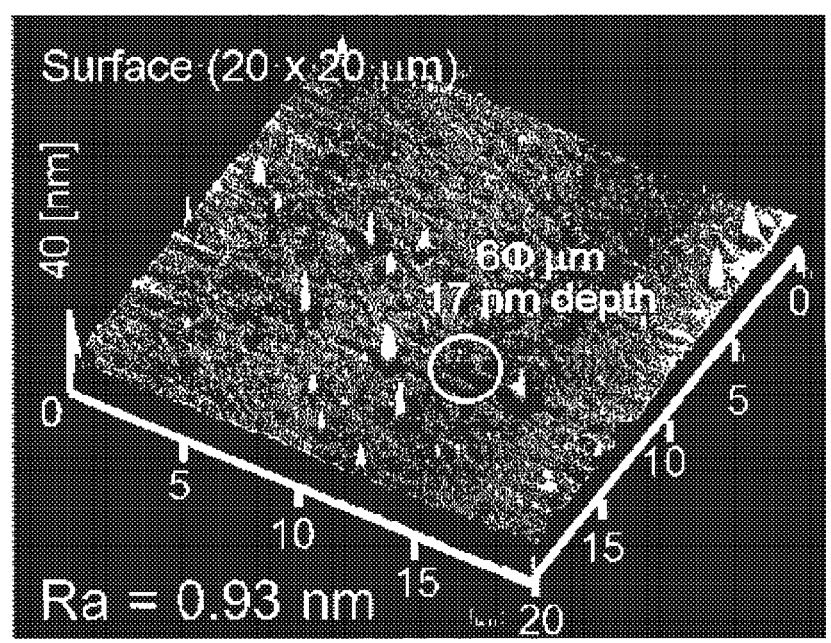

Further, the coating film was formed on glass under the same conditions as those described above, and the spectral transmittance was measured with a spectrophotometer (Hitachi U-4100). Micro Slide Glass S2111 (76 mm*76 mm*0.8 to 1.0 mm) manufactured by Matsunami Glass Ind., Ltd. was used as the glass substrate. FIG. 5 shows the results.

Example 2b

FH+FMA2

The same experiment as that in Example 1b above was carried out except that FH was used as the polyhedral oligomeric silsesquioxane in the solution A.

Example 2c

FH+FMA3

The same experiment as that in Example 1c above was carried out except that FH was used as the polyhedral oligomeric silsesquioxane in the solution A.

Example 2d

FH+FMA4

The same experiment as that in Example 1d above was carried out except that FH was used as the polyhedral oligomeric silsesquioxane in the solution A.

<Results of Evaluation in Examples 2a to 2d>

FIGS. 2A-2D are graphs showing relationships between proportions of the polyhedral oligomeric silsesquioxane FH contained and antifouling properties (contact angle and sliding angle) in Examples 2a to 2d.

The contact angles were improved with increasing proportion of the polyhedral oligomeric silsesquioxane FH contained. On the other hand, the sliding angle was found to decrease gradually (or temporarily increase and then decrease) and then change little even when the proportion of the oligomer increased.

Example 2e

FH+FA4

The same experiment as that in Example 2a above was carried out except that poly(2,2,3,3,4,4,4-heptafluorobutyl acrylate) represented by the following chemical formula (FA4: manufactured by Sigma-Aldrich Co., product number 630179) was used as the acrylate polymer (II).

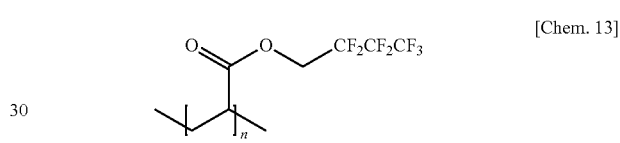

[Chem. 13]

Figure 4:
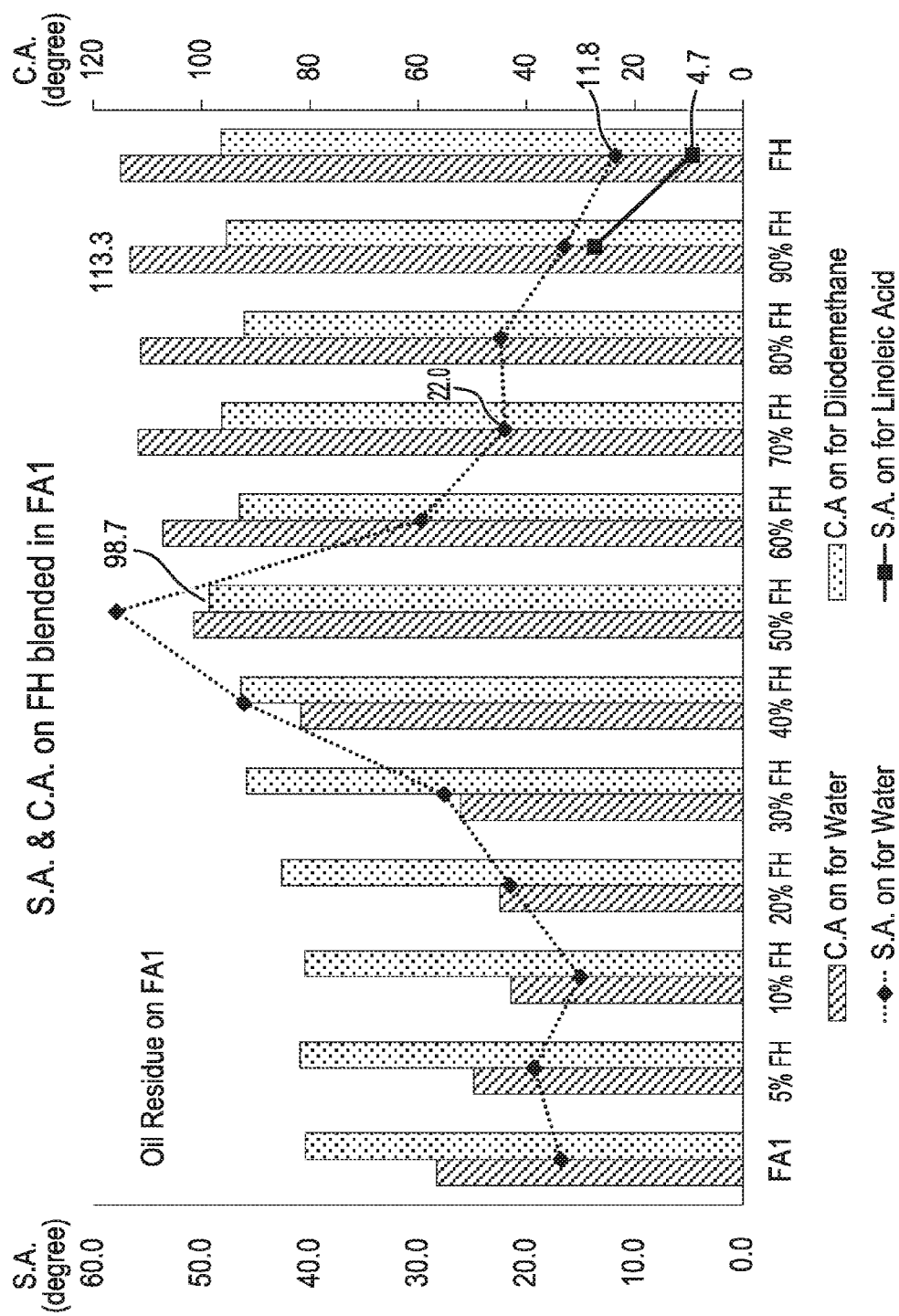
FIG. 4 is a graph showing a relationship between proportions of the polyhedral oligomeric silsesquioxane FH contained and antifouling properties (contact angle and sliding angle) in the case of using the acrylate polymer FA4.

FIG. 4 is a graph showing a relationship between proportions of the polyhedral oligomeric silsesquioxane FH contained and antifouling properties (contact angle and sliding angle).

The contact angles were improved with increasing proportion of the polyhedral oligomeric silsesquioxane FH contained. On the other hand, the sliding angle was found to increase temporarily and then decrease, and then change little even when the proportion of the oligomer increased.

Example 3a

FO+FMA1

The same experiment as that in Example 1a above was carried out except that (1H,1H,2H,2H-tridecafluorooctyl)$_8$Si$_8$O$_{12}$ represented by the following chemical formula was used as the polyhedral oligomeric silsesquioxane in the solution A.

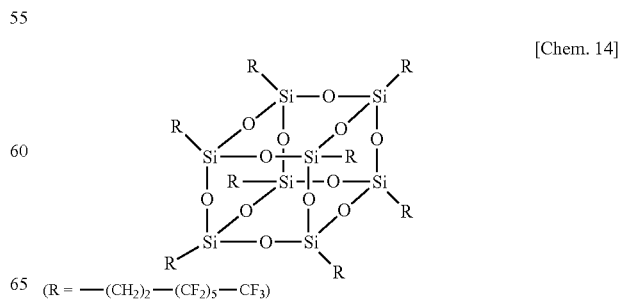

[Chem. 14]

(R = —(CH$_2$)$_2$—(CF$_2$)$_5$—CF$_3$)

Example 3b

FO+FMA2

The same experiment as that in Example 1b above was carried out except that FO was used as the polyhedral oligomeric silsesquioxane in the solution A.

Example 3c

FO+FMA3

The same experiment as that in Example 1c above was carried out except that FO was used as the polyhedral oligomeric silsesquioxane in the solution A.

Example 3d

FO+FMA4

The same experiment as that in Example 1d above was carried out except that FO was used as the polyhedral oligomeric silsesquioxane in the solution A.

<Results of Evaluation in Examples 3a to 3d>

FIGS. 3A-3D are graphs showing relationships between proportions of the polyhedral oligomeric silsesquioxane FO contained and antifouling properties (contact angle and sliding angle) in Examples 3a to 3d above.

The contact angles were improved with increasing proportion of the polyhedral oligomeric silsesquioxane FO contained. On the other hand, the sliding angle was found to change little in a certain range even when the proportion of the polyhedral oligomeric silsesquioxane FO contained increased.

Example 4

The 20% wt FH coating composition (FH+FMA1) prepared by the method of Example 2a was used to examine an effect of humidity in formation of the coating film.

Samples were prepared by the application step using a spin coater under the following four conditions:

(A) under an air atmosphere, temperature 23 deg C., relative humidity 30%;

(B) under an air atmosphere, temperature 28 deg C., relative humidity 60%;

(C) under an nitrogen gas atmosphere, temperature 28 deg C., relative humidity 45%; and (D) under an atmosphere formed by circulating a nitrogen gas through a dryer (molecular sieve column), temperature 28 C, relative humidity 30%.

Table 1 shows the results of the analysis.

TABLE 1

Result of dynamic wettability

| | Water | | Linoleic acid | |
|---|---|---|---|---|
| | Sliding angle | Hysteresis | Sliding angle | Hysteresis |
| (A) | 2.0° | 3.9Δθ | 1.0° | 3.1Δθ |
| (B) | 7.4° | 8.5Δθ | 5.4° | 5.8Δθ |
| (C) | 3.0° | 3.3Δθ | 1.8° | 1.7Δθ |
| (D) | 1.6° | 2.8Δθ | 3.3° | 3.4Δθ |

Here, the dynamic wettability means wettability at the time when a liquid droplet moves on a solid surface. The contact angle formed at the time refers to "dynamic contact angle," and is usually represented by an advancing contact angle ($theta_{advancing}$) and a receding contact angle ($theta_{receding}$) The contact angle hysteresis is represented as a difference between the advancing contact angle and the receding contact angle. The contact angle hysteresis is closely involved in molecular surface coverage and surface roughness. When the value of the contact angle hysteresis is small, a liquid droplet easily moves on the surface. On the other hand, when the value is large, a liquid droplet tends to remain on the surface.

FIGS. 6A-6D illustrate images of scanning probe microscopy.

In the samples prepared under the conditions A to D, the arithmetic mean roughnesses Ra's were 1.8 nm, 18.8 nm, 2.5 nm, and 0.93 nm, respectively.

In the sample prepared under the condition A, the sliding angles and hysteresis values for water and linoleic acid were small.

In the sample prepared under the condition D, the sliding angle for water was the smallest, and the hysteresis value was small.

In the coating film prepared under the condition B, dimples having micrometer sizes were observed. In the sample prepared under the condition B, the sliding angle was large. This is because moisture acts on the surface to form dimples, resulting in exhibiting a pinning effect.

In the sample prepared under the condition C, dimples having smaller sizes were observed compared with the dimples in the sample prepared under the condition B. In the sample prepared under the condition D which was a drier atmosphere as well, dimples having smaller sizes were observed. However, the number of the dimples was smaller than that in the sample prepared under the condition C.

The results suggest that moisture adsorbed on the surface in the spin coating step caused formation of dimples to exert the pinning effect, resulting in increasing the sliding angle.

It was found that, in order to provide a smooth surface, the application step was preferably carried out under a dry atmosphere. Specifically, in the coating films prepared under the conditions A, C, and D through the application under a dry atmosphere, the arithmetic mean roughness was 2.5 nm or less and the sliding angles for linoleic acid and pure water were 4.0 degrees or less. The dynamic wettability of the surfaces provided sufficiently excellent results in both the sliding angle and contact angle hysteresis values.

The invention claimed is:

1. An article having a coating on a substrate, wherein the coating comprises:
  (a) a polyhedral oligomeric silsesquioxane; and
  (b) an acrylate polymer having a structural unit represented by the following general formula (II):

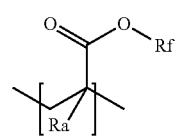

General formula (II)

where Ra represents a hydrogen atom or a methyl group, Rf represents $-CH_2-(CF_2)_q-CF_3$ or $-CH(CF_3)_2$, and q represents an integer of 0 to 8, wherein the coating comprises the polyhedral oligomeric silsesquioxane at least in the following proportion X:
the proportion X refers to, in "profile where as the proportion of the polyhedral oligomeric silsesquioxane increases, a liquid droplet sliding angle on a surface of a coating film decreases or temporarily increases and then decreases, but a change in the decrease gradually becomes smaller," a proportion at a starting point at which the change becomes smaller.

2. The article according to claim 1, wherein the a polyhedral oligomeric silsesquioxane is represented by the following general formula (I);

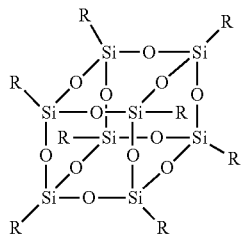

General formula (I)

where R represents —$(CH_2)_2$—$(CF_2)_p$—$CF_3$, and p represents an integer of 0 to 9.

3. The article according to claim 1, wherein the q represents an integer of 0 to 5.

4. The article according to claim 1, wherein the coating has a surface arithmetic mean roughness of 2.5 nm or less.

5. The article according to claim 1, wherein the coating has water repellency and oil repellency in which a sliding angle for linoleic acid is 4.0 degree or less and a sliding angle for pure water is 4.0 degrees or less.

6. The article according to claim 1, wherein the article has a transmittance to light having a wavelength of 400 to 850 nm of 93% or more.

7. The article according to claim 1, wherein the substrate has an optical power.

8. The article according to claim 1, wherein the article is an ophthalmic lens.

9. A coating composition, comprising:
(a) a polyhedral oligomeric silsesquioxane represented by the general formula (I);
(b) an acrylate polymer having a structural unit represented by the general formula (II); and
(c) a solvent for dissolving the polyhedral oligomeric silsesquioxane and the acrylate polymer:

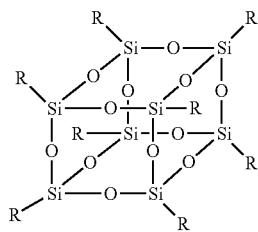

General formula (I)

where R represents —$(CH_2)_2$—$(CF_2)_p$—$CF_3$, and p represents an integer of 0 to 9;

General formula (II)

where Ra represents a hydrogen atom or a methyl group, Rf represents —$CH_2$—$(CF_2)_q$—$CF_3$ or —$CH(CF_3)_2$, and q represents an integer of 0 to 8,
wherein the coating comprises the polyhedral oligomeric silsesquioxane at least in the following proportion X:
the proportion X refers to, in "profile where as the proportion of the polyhedral oligomeric silsesquioxane increases, a liquid droplet sliding angle on a surface of a coating film decreases or temporarily increases and then decreases, but a change in the decrease gradually becomes smailler," a proportion at a starting point at which the change becomes smaller.

10. The coating composition according to claim 9, wherein the solvent comprises an organic compound containing at least one of chlorine and fluorine.

11. A method of manufacturing a coated article, comprising a coating step of applying the coating composition according to claim 9 to a surface of a substrate and removing the solvent.

12. A method of manufacturing a coated article according to claim 11, wherein the coating step is carried out at a humidity of 30% RH or less.

13. The method of manufacturing a coated article according to claim 11, wherein the coating step is carried out under a dehumidified atmosphere.

* * * * *